(12) United States Patent
Wang et al.

(10) Patent No.: US 6,534,636 B2
(45) Date of Patent: Mar. 18, 2003

(54) AZO-METAL COMPLEX DYE AND METHOD FOR PRODUCING THE SAME AND ITS USE FOR A HIGH DENSITY OPTICAL DISC RECORDING MEDIUM

(75) Inventors: Shin-Shin Wang, Hsinchu (TW); Hui-Ping Tsai, Hsinchu (TW); Wen-Yih Liao, Hsinchu (TW); Chien-Liang Huang, Hsinchu (TW); Tzuan-Ren Jeng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/858,782

(22) Filed: May 16, 2001

(65) Prior Publication Data

US 2002/0091241 A1 Jul. 11, 2002

(30) Foreign Application Priority Data

Nov. 2, 2000 (TW) ........................ 89123062 A

(51) Int. Cl.[7] .............................. C09B 45/14; G11B 7/24
(52) U.S. Cl. ................... 534/707; 430/270.16; 430/945
(58) Field of Search ..................... 534/707; 430/270.16, 430/945

(56) References Cited

U.S. PATENT DOCUMENTS 4,521,506 A * 6/1985 Stolzenburg et al. ....... 430/241
6,270,943 B1 * 8/2001 Chapman et al. ...... 430/270.16

FOREIGN PATENT DOCUMENTS

JP          04-062092      *   2/1992

* cited by examiner

*Primary Examiner*—Fiona T. Powers
(74) *Attorney, Agent, or Firm*—Darby & Darby

(57) ABSTRACT

This invention provides azo-metal complex dyes for a high-density optical disc recording medium having the following formula (I):

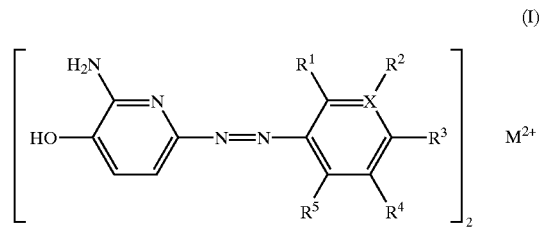

wherein $R^1$ reprents $C_{1-8}$ alkoxyl, carboxy, $C_{1-8}$ alkoxycarbonyl, or amide; $R^2$, $R^3$, $R^4$ and $R^5$ can be the same or not, which are hydrogen, $C_{1-8}$ alkyl, $C_{1-8}$ alkoxyl, carboxy, $C_{1-8}$ alkoxycarbonyl; $C_{1-6}$ alkylaminealkylenecarboxy, amide, nitro, trifluoro-methyl, sulfonic acid fluoride group, sulfonic acid group or halogen atom; X reprents carbon or nitrogen atom; and M reprents $Mg^{+2}$, $Mn^{+2}$, $Co^{+2}$, $Ni^{+2}$, $Cu^{+2}$ or $Zn^{+2}$, These azo-metal complex dyes whose spectra are capable of matching wavelength of 400 nm~700 nm visible light can be used as a high-density optical disc recording medium.

16 Claims, 2 Drawing Sheets

AZO-METAL COMPLEX DYE AND METHOD FOR PRODUCING THE SAME AND ITS USE FOR A HIGH DENSITY OPTICAL DISC RECORDING MEDIUM

BACKGROUND OF THE INVENTION

1. Field of the Invention

The present invention relates in general to azo-metal complex dye and method for producing the same and its use for a high density optical disc recording medium. In particular, the present invention relates to the azo-metal complex dyes which have strong absorption in the visible light region from 400 nm to 700 nm, light and thermal stabilities and dissolubility for organic solvent, and are suitable for producing high density optical disc recording medium.

2. Description of the Related Art

With the progress of generation, a great quantity of information is in circulation, but the traditional magnetic disc recording medium cannot satisfy the trend. Therefore, a recording medium with high density in storage, miniaturization and lower cost is needed, and the optical disc recording medium is developed. Recently, the functional pigments with the combination of organic synthesis chemistry and photochemistry have been used in several industries, such as non-linear optical elements, optical disc recording medium, photoresist, thermal/light/electric sensors and detectors, energy transfer and storage, medical treatment and organism.

In 1981, Law et al. applied 3,3'-diethyl-12-acetyl-thiotetracyanine perchlorate, a kind of cyanine dye, in the fabrication of the optical disc first (see K. Y. Law, P. S. Vincett, and G. E. Johnson, Appl. Phys. Lett., 39, 718 (1981)). These kinds of dyes were chosen for the reason that they match the near IR laser pickup head. Its manufacturing method is mixing a cyanine dye with PVAc, then coating the mixture on the substrate by spin coating to form an optical disc. With the success in applying the cyanine dye in optical memory material, different kinds of dyes are developed to use as the optical memory material, such as disclosing in JP 072254167, 09193545, 09194545, 09226250, 09274732, 10044066, 11310728 and so on. The organic dyes are used as storage material because they can be coated on the substrate by simple spin coating. The manufacturing time is short and the cost is reduced as compared with the vacuum sputtering coating. Hence, the dissolubility in organic solvent and the stability of the organic dyes are important factors.

Therefore, the object of the present invention is to synthesize azo-metal complex dyes which have strong absorption in the visible light region from 400 nm to 700 nm, light and thermal stabilities and dissolubility for organic solvent, and are suitable for producing high density optical disc recording medium.

DETAILED DESCRIPTION OF THE PRESENT INVENTION

Azo-Metal Complex Dye

An azo-metal complex dye represented by the following formula (I) for a high-density optical disc recording medium:

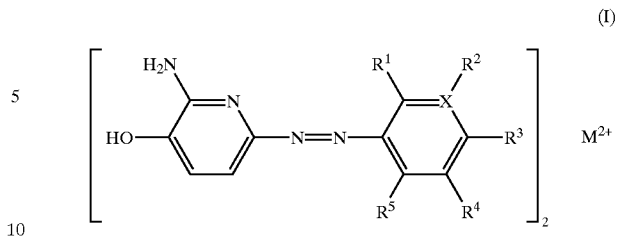

wherein $R^1$ is selected from the group consisting of $C_{1-8}$ alkoxyl, carboxy, $C_{1-8}$ alkyoxycarbonyl ($-CO_2R^6$) and amide ($-CONR^8R^9$);

$R^2$, $R^3$, $R^4$ and $R^5$ can be the same or different and are selected from the group consisting of hydrogen, $C_{1-8}$ alkyl, $C_{1-8}$ alkoxyl, carboxy, $C_{1-8}$ alkyoxycarbonyl ($-CO_2R^6$), $C_{1-6}$ alkylaminealkylenecarboxy ($-CO_2R^7NR^8R^9$), amide ($-CONR^8R^9$), nitro ($-NO_2$), trifluoromethyl ($-CF_3$), sulfonic acid fluoride group ($-SO_2F$), sulfonic acid group ($-SO_3H$) and halogen;

X is selected from the group consisting of carbon and nitrogen; and

M is selected from the group consisting of $Mg^{+2}$, $Mn^{+2}$, $Co^{+2}$, $Ni^{+2}$, $Cu^{+2}$, and $Zn^{+2}$.

If $R^1$, $R^2$, $R^3$, $R^4$ and/or $R^5$ in formula (I) are/is $C_{1-8}$ alkyoxycarbonyl ($-CO_2R^6$), $R^6$ can be $C_{1-8}$ alkyl.

If $R^2$, $R^3$, $R^4$ and/or $R^5$ in formula (I) are/is $C_{1-6}$ alkylaminealkylenecarboxy ($-Co_2R^7NR^8R^9$), $R^7$ can be $C_{1-8}$ alkylene, $R^8$ and $R^9$ can be the same or different and can be hydrogen or $C_{1-8}$ alkyl.

If $R^1$, $R^2$, $R^3$, $R^4$ and/or $R^5$ in formula (I) are/is $C_{1-8}$ amide ($-CONR^8R^9$), $R^8$ and $R^9$ can be the same or different and can be hydrogen or $C_{1-6}$ alkyl.

Preparing of the Azo-Metal Complex Dyes

The azo-metal complex dye suitable for a high density optical disc recording medium represented by the following formula (I),

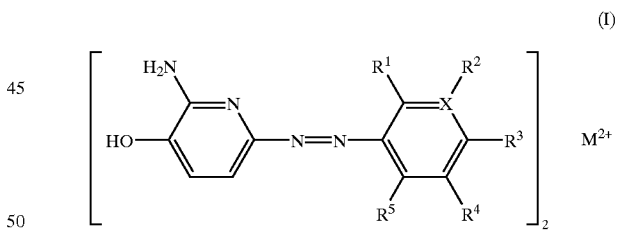

and is producing by the following steps.

(a) proceeding a diazotization to modify an amine having the following formula (II) to a diazonium salt.

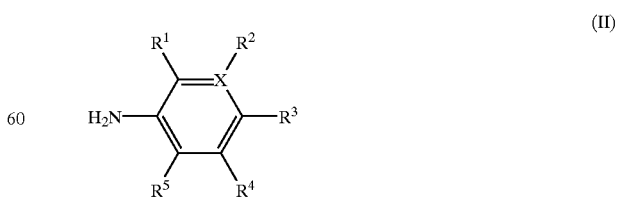

(b) proceeding a coupling reaction to couple 2-amino-3-hydroxypyridine as shown in formula (III) with the diazonium salt in an organic solvent.

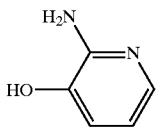

(III)

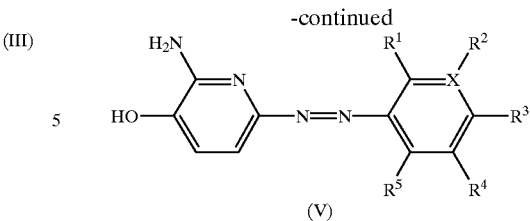

(V)

(c) proceeding a chelating reaction with metallic salt of bivalence in an organic solvent.

In the above-mentioned formulas (I), (II) and (III), $R^1$ can be $C_{1-8}$ alkoxyl, carboxy, $C_{1-8}$ alkyoxycarbonyl or amide; $R^2$, $R^3$, $R^4$ and $R^5$ are the same or different and can be hydrogen, $C_{1-8}$ alkyl, $C_{1-8}$ alkoxyl, carboxy, $C_{1-8}$ alkyoxycarbonyl, $C_{1-6}$ alkylaminealkylenecarboxy, amide, nitro, trifluoro-methyl, sulfonic acid fluoride group, sulfonic acid group or halogen; X can be carbon and nitrogen; and M can be $Mg^{+2}$, $Mn^{+2}$, $Co^{+2}$, $Ni^{+2}$, $Cu^{+2}$ or $Zn^{+2}$.

In the step (a), the diazotization can proceed by using one of two methods. The first method is reacting the amine with sodium nitrite ($NaNO_2$) and acid to form the diazonium salt represented by the following formula (IV), and the reaction is as follows:

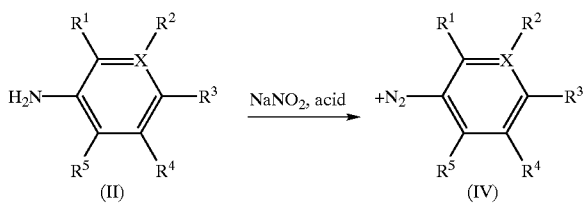

The second method is reacting the amine with nitrosyl-sulfuric acid ($HNOSO_4$) and acid to form the diazonium salt represented by the following formula (IV), and the reaction is as follows:

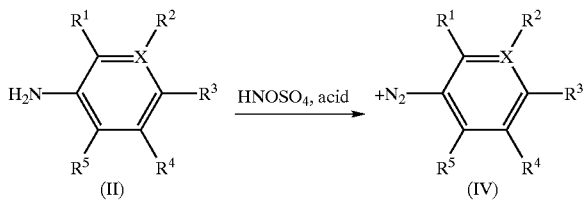

No matter which methods are chosen, the acid can be $H_2SO_4$, HOAc, $H_3PO_4$ and $C_2H_5COOH$.

In the step (b), the obtained diazonium salt represented by the formula (IV) reacts with 2-amino-3-hydroxypyridine as shown in formula (III) to form the azo compound, and the coupling reaction is as follows:

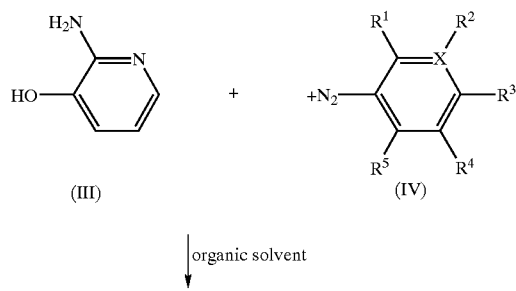

The organic solvent used in the coupling reaction can be $C_{1-6}$ alcohol, dimethyl sulfoxide (DMSO), N,N-dimethyl formamide (DMF), diacetone alcohol (DAA) and tetrahydrofuran (THF).

In the step (c), the obtained azo compound represented by the formula (V) reacts with metallic salt of bivalence, $MA_2$ or MB, in an organic solvent to form the azo-metal complex dye represented by the formula (I). If $MA_2$ is chosen as the chelating agent, A can be $OAc^-$, $Cl^-$, $Br^-$, or acetylacetonate. If MB is chosen as the chelating agent, B can be $Co_3^{-2}$ or $SO_4^{-2}$.

Preparing of the High Density Optical Disc Recording Medium

The method for producing a high density optical disc recording medium, comprising the following steps:
(a) providing a first substrate;
(b) dissolving the azo-metal complex dye set forth in claim 1 in an organic solvent to form a solution, and coating the first solution on the first substrate;
(c) drying the solution to form an azo-metal complex dye layer;
(d) disposing a reflection layer on the azo-metal complex dye layer; and
(e) disposing a second substrate on the reflection layer In the step (b), the organic solvent can be $C_{1-6}$ alcohol, $C_{1-6}$ ketone, $C_{1-6}$ ether, halogen compound or amide. Wherein, $C_{1-6}$ alcohol can be methanol, ethanol, isopropanol, diacetone alcohol (DAA), 2,2,3,3-tetrafluoropropanol, trichloroethanol, 2-chloroethanol, octafluoropentanol or hexafluorobutanol; $C_{1-6}$ ketone can be acetone, methyl isobutyl ketone (MIBK), methyl ethyl ketone (MEK) or 3-hydroxy-3-methyl-2-butanone; the halogen compound can be chloroform, dichloromethane or 1-chlorobutane; and the amide can be dimethylformamide (DMF) or dimethylacetamide (DMA).

After the azo-metal complex dye is dissolved in the above-mentioned organic solvent, it is coated on the first substrate by, such as spray, roller, dip, spin coating and so on. Then proceeding the swing and dry processes on sequence to drive the organic solvent away, so as to form the azo-metal complex dye layer on the first substrate. Then, step (d) is follows.

In the step (d), the material of the reflection layer is such as Au, Ag, Al, Cu or Cr.

In the step (e), another second spare substrate is bonded with the first substrate which has the azo-metal complex dye layer and the reflection layer thereon to form the high-density optical disc recording medium. The bonding method may be one such as spin coating, printing, glue melting by heat and so on.

The present invention will become more fully understood from the detailed description given hereinbelow and the accompanying drawings, given by way of illustration only and thus not intended to be limitative of the present invention.

EXAMPLES

Figure 1:
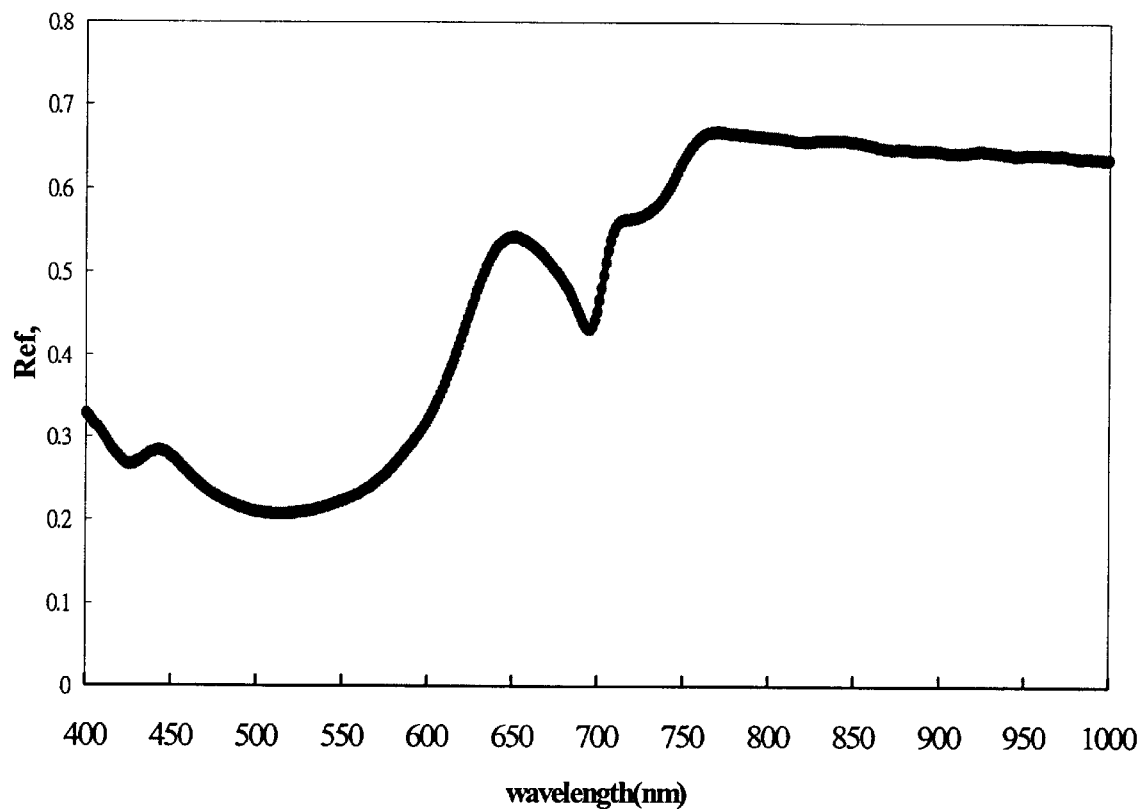
FIG. 1 shows the spectrum of reflection vs. wavelength for compound 8 applying to a high density optical disc recording medium.

Table 1 lists 31 examples of azo-metal complex dyes having substituents $R^1$, $R^2$, $R^3$, $R^4$ and $R^5$, atom X and metal M of the present invention, and also lists their physical properties about wavelength of maximum absorption ($\lambda_{max}$ (nm)) and absorption coeffient ($\epsilon$).

Without any intention of limiting itself in any way, the present invention is illustrated further by the following examples.

Example 1
Preparation of Compound 8

0.5 g of butyl 3-amino-4-methoxybenzoate was dissolved in 30 ml of methanol and 10 ml of 6N HCl. After the temperature dropped to 0~5° C., 0.18 g of $NaNO_2$ in 5 ml of $H_2O$ was slowly added in the solution and stirred for 0.5~1 hours.

The obtained solution was slowly added in another solution which contained 0.25 g of 2-amino-3-hydroxypyridine dissolved in 50 ml of methanol and the temperature of which had been dropped to 0~5° C. The reaction was conducted for 1 hour. 0.542 g of a solid product was obtained after filtering, washed with water and dried. 0.542 g of the obtained solid product was dissolved in 20 ml of methanol, then 0.96 g of zinc acetate in 10 ml of methanol was added. The reaction was conducted for 2 hours. After filtered, washed with water and isopropyl ether, and dried, 0.697 g of a chelated product, compound 8 as shown in Table 1, was obtained. The product yield was 82.5%.

The analytical data of the chelated product, compound 8, is as follows: the melting point is 196° C., the decomposed temperature is 208° C., $UV_{max}$ is 548 nm, and $\epsilon$ is $8.64 \times 10^4$.

Example 2
Preparation of Compound 27

6.85 g of butyl 2-amino-5-methyl benzoate was dissolved in 30 ml of methanol and 30 ml of 6N HCl. After the temperature dropped to 0~5° C., 2.74 g of $NaNO_2$ in 20 ml of $H_2O$ was slowly added in the solution and stirred for 0.5~1 hours.

The obtained solution was slowly added in another solution which contained 3.64 g of 2-amino-3-hydroxypyridine dissolved in 200 ml of methanol and whose temperature was dropped to 0~5° C. The reaction was conducted for 1 hour. Then a solid product was obtained after filtering, washed with water and dried. The obtained solid product was dissolved in 300 ml of methanol, then 21.8 g of zinc acetate in 200 ml of methanol was added. The reaction was conducted for 3 hours. After filtering, washing with water and isopropyl ether, and drying, 8.4 g of a chelated product, compound 27 as shown in Table 1, was obtained. The product yield was 70.4%.

The analytical data of the chelated product, compound 27, is as follows: the melting point is 227° C., the decomposed temperature is 234° C., $UV_{max}$ is 553.5 nm, and $\epsilon$ is $7.43 \times 10^4$.

TABLE 1

Examples of the azo-metal complex dyes

| | | | | | | | | | $\lambda_{max}$(nm) | | |
| --- | --- | --- | --- | --- | --- | --- | --- | --- | --- | --- | --- |
| Compound | X | $R^1$ | $R^2$ | $R^3$ | $R^4$ | $R^5$ | M | Solution | film | $\epsilon$ |
| 1 | C | $OCH_3$ | H | $NO_2$ | H | H | Mg | 507 | — | — |
| 2 | C | $OCH_3$ | H | $NO_2$ | $OCH_3$ | H | Zn | 583 | — | — |
| 3 | C | $OCH_3$ | H | H | $CF_3$ | H | Zn | 547 | — | — |
| 4 | C | $OCH_3$ | H | H | $SO_3H$ | H | Zn | 551 | — | — |
| 5 | C | $OCH_3$ | H | H | $SO_2F$ | H | Zn | 545.5 | — | — |
| 6 | C | $OCH_3$ | H | $OCH_3$ | H | H | Zn | 545 | — | $5.4 \times 10^4$ |
| 7 | C | $OCH_3$ | H | H | $CO_2CH_3$ | H | Zn | 548.5 | — | $5.9 \times 10^4$ |
| 8 | C | $OCH_3$ | H | H | $CO_2C_4H_9$ | H | Zn | 548 | 499.5 | $8.64 \times 10^4$ |
| 9 | C | $OCH_3$ | H | $CO_2CH(CH_3)_2$ | H | H | Zn | 564 | 515.5 | $8.95 \times 10^4$ |
| 10 | C | $OC_4H_9$ | H | $CO_2C_2H_4N(C_2H_5)_2$ | H | H | Zn | 565.5 | 540.5 | $1.03 \times 10^5$ |
| 11 | N | $OCH_3$ | — | $OCH_3$ | H | H | Zn | 555 | 565 | $7.0 \times 10^4$ |
| 12 | N | $OCH_3$ | — | $OCH_3$ | H | H | Ni | 558 | — | $3.7 \times 10^4$ |
| 13 | N | $OCH_3$ | — | $OCH_3$ | H | H | Mn | 510 | — | $1.4 \times 10^4$ |
| 14 | N | $OCH_3$ | — | $OCH_3$ | H | H | Mg | 509 | — | $5.2 \times 10^4$ |
| 15 | C | $CO_2H$ | H | H | H | H | Ni | 533.5 | — | — |
| 16 | C | $CO_2H$ | H | H | H | H | Zn | 537.5 | — | — |
| 17 | C | $CO_2H$ | H | H | H | H | Mn | 564.5 | — | — |
| 18 | C | $CO_2H$ | F | H | H | H | Ni | 531.5 | — | $7.47 \times 10^4$ |
| 19 | C | $CO_2H$ | H | $CH_3$ | H | H | Ni | 532.5 | — | $6.17 \times 10^4$ |
| 20 | C | $CO_2H$ | H | $CH_3$ | H | H | Zn | 534 | — | $1.2 \times 10^4$ |
| 21 | C | $CO_2H$ | H | $CH_3$ | H | $CH_3$ | Ni | 498 | — | — |
| 22 | C | $CO_2Et$ | H | H | H | H | Ni | 555 | — | — |
| 23 | C | $CO_2Et$ | H | H | H | H | Zn | 549.5 | 518.5 | $7.97 \times 10^4$ |
| 24 | C | $CO_2Et$ | H | H | H | H | Mn | 543.5 | — | — |
| 25 | C | $CO_2C_4H_9$ | H | H | H | H | Zn | 549 | 513.5 | $8.55 \times 10^4$ |
| 26 | C | $CO_2C_8H_{17}$ | H | H | H | H | Zn | 549 | 553.5 | $7.81 \times 10^4$ |
| 27 | C | $CO_2C_4H_9$ | H | $CH_3$ | H | H | Zn | 553.5 | 526.5 | $7.43 \times 10^4$ |
| 28 | C | $CO_2C_4H_9$ | H | $CH_3$ | H | H | Ni | 558.5 | — | — |
| 29 | C | $CO_2CH_3$ | F | H | H | H | Zn | 537 | 518.5 | — |

TABLE 1-continued

Examples of the azo-metal complex dyes

| Compound | X | R¹ | R² | R³ | R⁴ | R⁵ | M | $\lambda_{max}$(nm) Solution | film | $\epsilon$ |
|---|---|---|---|---|---|---|---|---|---|---|
| 30 | C | CO$_2$C$_4$H$_9$ | F | H | H | H | Zn | 538 | — | — |
| 31 | C | CO$_2$CH$_3$ | H | OCH$_3$ | OCH$_3$ | H | Zn | 560.5 | 507.5 | 4.04 × 10⁴ |

The azo-metal complex dyes of the present invention are suitable for fabricating a high density optical disc recording medium. The fabrication method is illustrated further by the following application examples 1, 2 and 3 with respectively using compounds 8, 23 and 25.

Application Example 1
Preparation of the High Density Optical Disc Recording Medium with Compound 8

1.5 g of the azo-metal complex dye of compound 8 showed in Table 1 was dissolved in 2,2,3,3-tetrafluoropropanol to form 100 g of solution A.

The obtained solution A was coated on a spare substrate by a spinner using the following procedures:

| Spining process: | 30~500 rpm | 2~10 seconds |
| Swing process: | 1000~3000 rpm | 10~30 seconds |
| Curing process: | 2000~5000 rpm | 10~30 seconds |

Then an azo-metal complex dye layer with a thickness of about 1000~2500 Å was formed on the substrate. A reflection layer of Au or Ag with a thickness of 500~1500 Å was plated on the azo-metal complex dye layer. Another spare substrate was bonded with the obtained substrate to form the high density optical disc recording medium. FIG. 1 shows its spectrum of reflection vs. wavelength. As seen from the FIG. 1, if the wavelength is below 635 nm or 650 nm, the reflection is over 45%.

The obtained optical disc was writing and reading under the eight to fourteen modulation (EFM) signal condition provided by PULSTEC DDU-1000. The writing conditions are as follows: constant linear velocity (CLV) is 3.5 m/s, numerical aperture (NA) is 0.6, wavelength is 637.8 nm, writing power is 6~14 mW. The reading condition are as follows: CLV is 3.5 m/s, wavelength is 637.8 nm, NA is 0.6, reading power is 0.5~2 mW. The CNR values of the obtained optical disc under different writing power are tabled in table 2.

TABLE 2

The CNR values of the high density optical disc recording medium with application of compound 8

| Writing power (mW) | 7 | 8 | 9 | 10 | 11 | 12 | 13 | 14 |
|---|---|---|---|---|---|---|---|---|
| 3T CNR (dB) | 39.0 | 46.4 | 58.0 | 60.2 | 53.3 | 52.6 | 51.7 | 48.5 |

As can be seen from the data set forth in Table 2 above, when the writing power is over 8 mW, the CNR value is over 45 dB, and when the writing power is 10 mW, the CNR value reaches 60 dB.

Application Example 2
Preparation of the High Density Optical Disc Recording Medium with Compound 23

2.5 g of the azo-metal complex dye of compound 23 showed in Table 1 was dissolved in 9:1 of 2,2,3,3-tetrafluoropropanol and trichloroethanol to form 100 g of solution B.

The obtained solution B was coated on a spare substrate by a spinner with the following procedures:

| Spining process: | 30~700 rpm | 1~10 seconds |
| Swing process: | 600~4000 rpm | 2~20 seconds |
| Curing process: | 3000~5000 rpm | 1~30 seconds |

Figure 2:
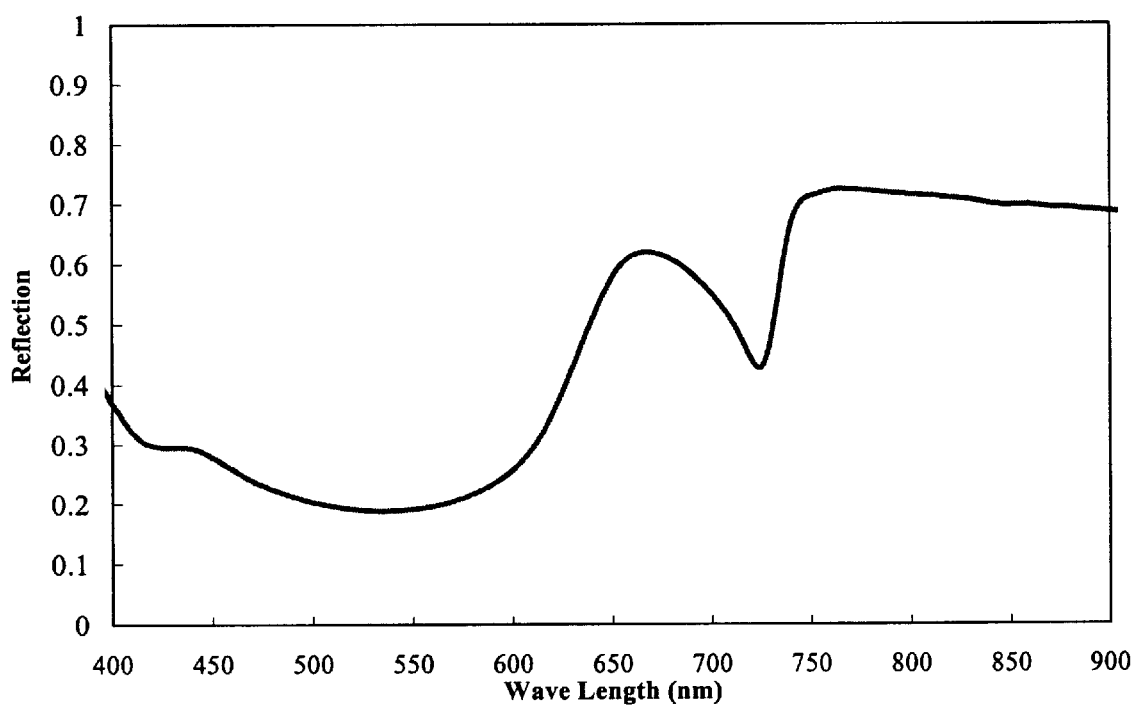
FIG. 2 shows the spectrum of reflection vs. wavelength for compound 23 applying to a high density optical disc recording medium.

Then an azo-metal complex dye layer with a thickness of about 1000~2500 Å was formed on the substrate. A reflection layer of Au or Ag with a thickness of 500~1500 Å was plated on the azo-metal complex dye layer. Another spare substrate was bonded with the obtained substrate to form the high density optical disc recording medium. FIG. 2 shows its spectrum of reflection vs. wavelength. As seen from the FIG. 2, if the wavelength is below 635 nm or 650 nm, the reflection is over 45%.

The obtained optical disc was writing and reading under the eight to fourteen modulation (EFM) signal condition provided by PULSTEC DDU-1000. The writing conditions are as follows: CLV is 3.5 m/s, wavelength is 637.8 nm, NA is 0.6, writing power is 6~14 mW. The reading condition are as follows: CLV is 3.5 m/s, wavelength is 637.8 nm, NA is 0.6, reading power is 0.5~2 mW. The CNR values of the obtained optical disc under different writing power are tabled in table 3.

TABLE 3

The CNR values of the high density optical disc recording medium with application of compound 23

| Writing power (mW) | 7 | 8 | 9 | 10 | 11 | 12 | 13 | 14 |
|---|---|---|---|---|---|---|---|---|
| 3T CNR (dB) | 37.1 | 39.7 | 42.3 | 45.1 | 47.7 | 49.9 | 51.8 | 52.9 |

As can be seen from the data set forth in Table 3 above, when the writing power is over 10 mW, the CNR value is over 45 dB.

Application Example 3
Preparation of the High Density Optical Disc Recording Medium with Compound 25

1.5 g of the azo-metal complex dye of compound 25 showed in Table 1 was dissolved in 2,2,3,3-tetrafluoropropanol to form 100 g of solution C.

The obtained solution C was coated on a spare substrate by a spinner with the following procedures:

| Spining process: | 30~500 rpm | 2~10 seconds |
| Swing process: | 1000~3000 rpm | 10~30 seconds |
| Curing process: | 2000~5000 rpm | 10~30 seconds |

Then an azo-metal complex dye layer with a thickness of about 1000~2500 Å was formed on the substrate. A reflection layer of Au or Ag with a thickness of 500~1500 Å was plated on the azo-metal complex dye layer. Another spare substrate was bonded with the obtained substrate to form the high density optical disc recording medium. When the wavelength is below 635 nm or 650 nm, the reflection is over 45%.

The obtained optical disc was writing and reading under the eight to fourteen modulation (EFM) signal condition provided by PULSTEC DDU-1000. The writing conditions are as follows: CLV is 3.5 m/s, wavelength is 637.8 nm, NA is 0.6, writing power is 6~14 mW. The reading condition are as follows: CLV is 3.5 m/s, wavelength is 637.8 nm, NA is 0.6, reading power is 0.5~2 mW. The CNR values of the obtained optical disc under different writing power are tabled in table 4.

TABLE 4

The CNR values of the high density optical disc recording medium with application of compound 25

| Writing power (mW) | 7 | 8 | 9 | 10 | 11 | 12 | 13 | 14 |
|---|---|---|---|---|---|---|---|---|
| 3T CNR (dB) | 35.8 | 39.3 | 42 | 45 | 48 | 55.7 | 57.9 | 60.1 |

As can be seen from the data set forth in Table 4 above, when the writing power is over 10 mW, the CNR value is over 45 dB.

According to the above-mentioned description, the azo-metal complex dyes whose spectra are capable of matching wavelength of 400 nm~700 nm visible light have higher recording sensitivity and S/N value and can be used as an optical disc recording medium. Moreover, the azo-metal complex dyes can dissolve in alcohol, ketone, ether, halogen compound, or amide, then it is possible to coat them on the substrate by simple coating method, such as spray, roller, dip, or spinning coating. The azo-metal complex dyes can be not only optical disc recording medium but also photoresist used in IC, fiber coloring in textile, copy, and print.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is Claimed is:

1. An azo-metal complex dye represented by the following formula (I) for a high density optical disc recording medium:

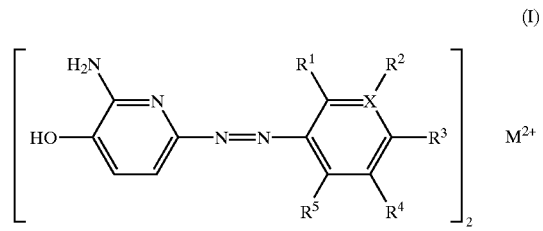

wherein
$R^1$ is selected from the group consisting of carboxy, $C_{1-8}$ alkoxycarbonyl ($-CO_2R^6$) and amide ($-CONR^8R^9$);
$R^2$, $R^3$, $R^4$ and $R^5$ may be the same or different and are selected from the group consisting of hydrogen, $C_{1-8}$ alkyl, $C_{1-8}$ alkoxyl, carboxy, $C_{1-8}$ alkoxycarbonyl ($-CO_2R^6$), $C_{1-6}$ alkylaminealkylenecarboxy ($-CO_2R^7NR^8R^9$), amide ($-CONR^8R^9$), nitro ($-NO_2$), trifluoro-methyl ($-CF_3$), sulfonic acid fluoride group ($-SO_2F$), sulfonic acid group ($-SO_3H$) and halogen;
X is selected from the group consisting of carbon and nitrogen;
M is selected from the group consisting of $Mg^{+2}$, $Mn^{+2}$, $Co^{+2}$, $Ni^{+2}$, $Cu^{+2}$ and $Zn^{+2}$;
$R^6$ is $C_{1-8}$ alkyl;
$R^7$ is $C_{1-8}$ alkylene; and
$R^8$ and $R^9$ may be the same or different and are selected from the group consisting of hydrogen and $C_{1-6}$ alkyl.

2. A method for producing a high density optical disc recording medium, comprising:
(a) providing a first substrate;
(b) dissolving an azo-metal complex dye represented by formula (I):

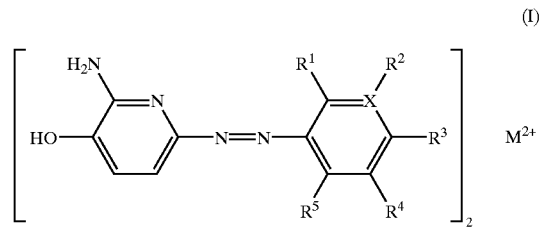

wherein
$R^1$ is selected from the group consisting of $C_{1-8}$ alkoxyl, carboxy, $C_{1-8}$ alkoxycarbonyl ($-CO_2R^6$) and amide ($-CONR^8R^9$);
$R^2$, $R^3$, $R^4$ and $R^5$ may be the same or different and are selected from the group consisting of hydrogen, $C_{1-8}$ alkyl, $C_{1-8}$ alkoxyl, carboxy, $C_{1-8}$ alkoxycarbonyl ($-CO_2R^6$), $C_{1-6}$ alkylaminealkylenecarboxy ($-CO_2R^7NR^8R^9$), amide ($-CONR^8R^9$), nitro ($-NO_2$), trifluoro-methyl ($-CF_3$), sulfonic acid fluoride group ($-SO_2F$), sulfonic acid group ($-SO_3H$) and halogen;
X is selected from the group consisting of carbon and nitrogen;
M is selected from the group consisting of $Mg^{+2}$, $Mn^{+2}$, $Co^{+2}$, $Ni^{+2}$, $Cu^{+2}$ and $Zn^{+2}$;
$R^6$ is $C_{1-8}$ alkyl;
$R^7$ is $C_{1-8}$ alkylene; and R⁸ and R⁹ may be the same or different and are selected from the group consisting of hydrogen and $C_{1-6}$ alkyl in an organic solvent to form a solution, and coating the first solution on the first substrate;

(c) drying the solution to form an azo-metal complex dye layer;

(d) disposing a reflection layer on the azo-metal complex dye layer; and (e) disposing a second substrate on the reflection layer.

3. The method for producing the high density optical disc recording medium as claimed in claim 2, wherein the material of the reflection layer is selected from the group consisting of Au, Ag, Al, Cu and Cr.

4. The method for producing the high density optical disc recording medium as claimed in claim 2, wherein the organic solvent is selected from the group consisting of $C_{1-6}$ alcohol, $C_{1-6}$ ketone, $C_{1-6}$ ether, halogen compound and amide.

5. The method for producing the high density optical disc recording medium as claimed in claim 4, wherein the $C_{1-6}$ alcohol is selected from the group consisting of methanol, ethanol, isopropanol, diacetone alcohol (DAA), 2,2,3,3-tetrafluoropropanol, trichloroethanol, 2-chloroethanol, octafluoropentanol and hexafluorobutanol.

6. The method for producing the high density optical disc recording medium as claimed in claim 4, wherein the $C_{1-6}$ ketone is selected from the group consisting of acetone, methyl isobutyl ketone (MIBK), methyl ethyl ketone (MEK) and 3-hydroxy-3-methyl-2-butanone.

7. The method for producing the high density optical disc recording medium as claimed in claim 4, wherein the halogen compound is selected from the group consisting of chloroform, dichloromethane and 1-chlorobutane.

8. The method for producing the high density optical disc recording medium as claimed in claim 4, wherein the amide is selected from the group consisting of dimethylformamide (DMF) and dimethylacetamide (DMA).

9. A method for producing an azo-metal complex dye represented by the following formula (I), the azo-metal complex dye suitable for a high density optical disc recording medium, comprising the steps of:

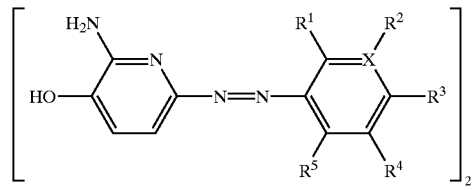
(I)

(a) performing a diazotization to modify an amine having the following formula (II) to a diazonium salt;

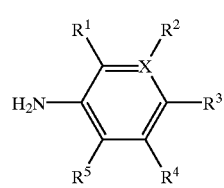
(II)

(b) performing a coupling reaction to couple 2-amino-3-hydroxypyridine as shown in formula (III) with the diazonium salt in an organic solvent; and

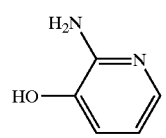
(III)

(c) performing a chelating reaction with metallic salt of bivalence in an organic solvent, wherein
$R^1$ is selected from the group consisting of $C_{1-8}$ alkoxyl, carboxy, $C_{1-8}$ alkoxycarbonyl and amide,
$R^2$, $R^3$, $R^4$ and $R^5$ can be the same or different and are selected from hydrogen, $C_{1-8}$ alkyl, $C_{1-8}$ alkoxyl, carboxy, $C_{1-8}$ alkoxycarbonyl, $C_{1-6}$ alkylaminealkylenecarboxy, amide, nitro, trifluoromethyl, sulfonic acid fluoride group, sulfonic acid group and halogen,
X is selected from the group consisting of carbon and nitrogen, and
M is selected from the group consisting of $Mg^{+2}$, $Mn^{+2}$, $Co^{+2}$, $Ni^{+2}$, $Cu^{+2}$ and $Zn^{+2}$.

10. The method as claimed in claim 9, wherein the diazotization comprises reacting the amine with $NaNO_2$ and acid.

11. The method as claimed in claim 10, wherein the acid is selected from the group consisting of HCl, $H_2SO_4$, HOAC, $H_3PO_4$ and $C_2H_5COOH$.

12. The method as claimed in claim 9, wherein the diazotization comprises reacting the amine with $HNOSO_4$ and acid.

13. The method as claimed in claim 12, wherein the acid is selected from the group consisting of $H_2SO_4$, HOAc, $H_3PO_4$ and $C_2H_5COOH$.

14. The method as claimed in claim 9, wherein the organic solvent is selected from the group consisting of $C_{1-6}$ alcohol, DMSO, DMF, DAA and THF.

15. The method as claimed in claim 9, wherein a chelating agent is $MA_2$, A is selected from the group consisting of $OAc^-$, $Cl^-$, $Br^-$, and acetyl acetonate.

16. The method as claimed in claim 9, wherein a chelating agent is MB, B is selected from the group consisting of $CO_3^{-2}$ and $SO_4^{-2}$.

* * * * *